Dec. 23, 1969   K. H. KLÜVER   3,485,111
GEAR SHIFTING MECHANISM
Filed Jan. 2, 1968   2 Sheets-Sheet 1
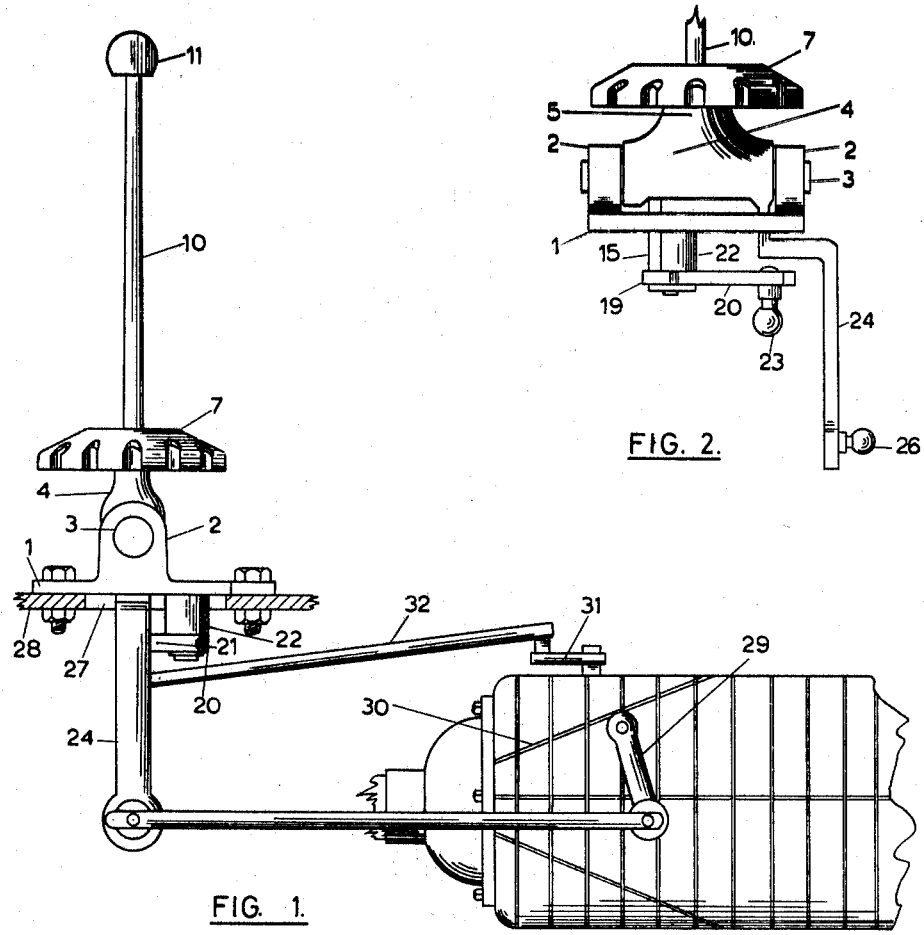
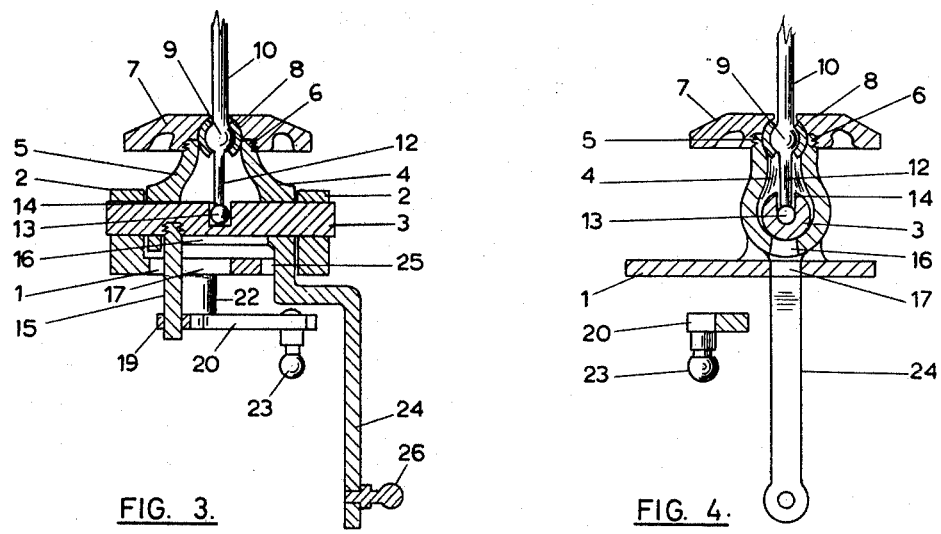

Dec. 23, 1969    K. H. KLÜVER    3,485,111

GEAR SHIFTING MECHANISM

Filed Jan. 2, 1968    2 Sheets-Sheet 2

United States Patent Office 3,485,111
Patented Dec. 23, 1969

3,485,111
GEAR SHIFTING MECHANISM
Klaus H. Klüver, Blairgowrie, Randburg, Transvaal, Republic of South Africa, assignor to K.G.B. Enterprises (Proprietary) Limited, Johannesburg, Transvaal, Republic of South Africa
Filed Jan. 2, 1968, Ser. No. 694,984
Claims priority, application Republic of South Africa, Jan. 18, 1967, 67/0294
Int. Cl. G05g 9/00
U.S. Cl. 74—473                      6 Claims

ABSTRACT OF THE DISCLOSURE

The invention concerns a gear shift mechanism for motor vehicles wherein the mechanism is mounted on the floor and connected to the gear box operating levers through linkages. The mechanism has co-axial journals supporting an axially slidable rod with a rotatable mounting on the operating rod and with both the mounting and operating rod co-operating with levers in the linkage to the gear box operating levers.

---

The present invention relates to a new or improved gear shifting mechanism and more particularly relates to a floor operable gear shift mechanism.

Many motor vehicles are sold with the so-called column gear shift as a standard fitting. This type of gear shift requires a relatively large number of linkages and other moving parts in order to function correctly and these moving parts tend to wear and thus often result in malfunctioning of the gear shift mechanism. Furthermore many drivers prefer a floor mounted gear shift since they find it more convenient to operate. Thus it is often desirable to convert existing column gear shifts to floor gear shifts. Conversion kits for effecting the above conversion have been made but these are normally confined to use on a single model or single make of motor vehicle. Also existing conversions and standard floor mounted shifts are always mounted onto the gear box itself, thus sometimes necessitating alterations thereto, are relatively difficult to fit and are generally expensive.

It is the object of this invention to provide a floor operable gear shift which is relatively cheap, easy to fit, has relatively few linkages and which may be used in a number of different makes or models of motor vehicles with minor modifications only being required.

According to this invention there is provided a motor vehicle floor operable gear shift mechanism, a base plate supporting co-axial journals thereon, an axially slidable operating rod in said journals, a rotatable mounting on the operating rod, levers connected to said rod and mounting adapted to be linked to the control levers projecting from a motor vehicle gear box.

The invention also provides for the mechanism to include spring loading to hold the operating rod normally in a predetermined position, relative to the journals and mounting.

Further features of the invention provide for the mechanism to be fitted with a gear shift lever adapted to rotate the mounting and slide the operating rod independently of each other, for the gear shift lever to extend through and be pivotally secured to the mounting itself, for the mounting to carry an arm extending away from the gear shift lever and for the operating rod to carry a pin thereon extending away from the axis of the rod and oppositely to the gear shift lever.

Still further features of the invention provide for the operating rod to be transverse the drive line of a vehicle when it is fitted thereto and for a bell crank to be utilized in one of the linkage systems.

Figure 5:
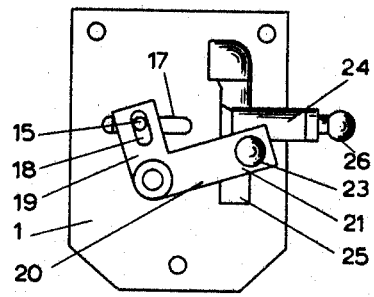
Figure 6:
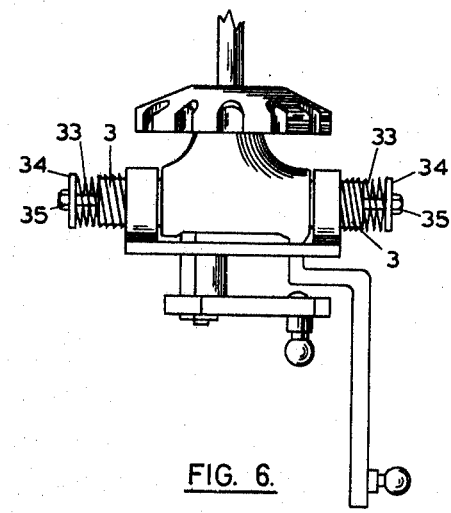
Figure 7:
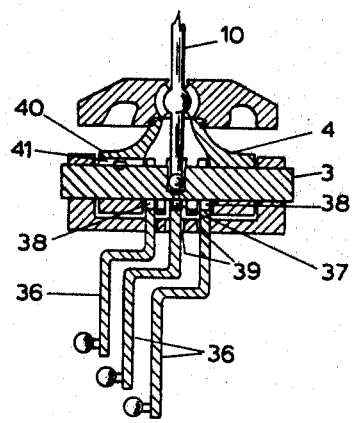
Figure 8:
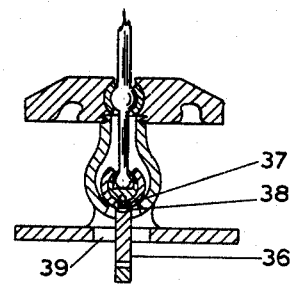

Preferred forms of this invention will now be described with reference to the accompanying drawings in which FIGS. 1 to 6 illustrate a mechanism for use with a motor vehicle gear box having both selector and gear operating levers while FIGS. 7 and 8 illustrate a mechanism for use with a gear box having operating levers only projecting therefrom.

In the drawings:

FIG. 1 shows diagrammatically the gear shift in position.

FIG. 2, an elevation of the gear shift mechanism.

FIG. 3, a sectional elevation of the mechanism.

FIG. 4, a sectional elevation at right angles to that shown in FIG. 3.

FIG. 5, an inverted plan.

FIG. 6, a modification showing spring loading of the operating rod.

FIG. 7, a sectional elevation of the mechanism adapted for use with gear boxes having operating levers only, and FIG. 8, a sectional elevation at right angles to that shown in FIG. 7.

Referring to FIGS. 1 to 5 of the drawings the gear shift mechanism of this example will be described in the orientation in which it would be when fitted to a motor vehicle. The base plate 1 in this case is substantially rectangular and flat and has two co-axial journals 2 protruding upwardly therefrom, one journal on each of two opposite sides of the base plate. Through these two journals 2 passes an axially slidable operating rod 3. On the rod 3 and extending substantially the whole distance between the journals 2 is an inverted T-shaped mounting 4, the upwardly extending stem 5 of the inverted T being hollow and being externally screw threaded at its upper end 6. Onto this thread is screwed a metal or other suitable casting or moulding 7 which includes the socket 8 of a ball and socket type joint. The ball 9 for this point is located towards the lower end of a gear shift lever 10 which extends upwardly for any suitable distance and terminates in a knob 11 or other suitable handle to facilitate its manipulation. The lower end 12 of the gear shift lever 10 extends downwardly through the stem 5 of the inverted T-shaped mounting 4 and terminates in a further ball-shape 13 which is positioned in a socket 14, in the operating rod 3 the centre of the ball 13 being as near as possible on the axis of the operating rod 3.

Thus it will be appreciated that motion of the upper end of the gear shift lever 10 in a line parallel with the axis of the operating rod 3 will cause a siding motion of the latter in a direction opposite that of the top of the gear shift lever 10 without any rotary motion of the mounting 4. Also movement of the top of the gear shift lever 10 in a line at right angles to the above will cause limited rotary motion of the mounting 4 without causing any motion of the operating rod 3.

Extending vertically downwards from the operating rod 3 is a pin 15 which extends through an axially elongated cut away portion 16 in the underside of the mounting 4 and through a slot 17 parallel to the rod 3 in the base plate 1. The cut-away portion 16 in the mounting 4 must be wide enough to permit the required limited rotary motion of the mounting 4 without interference with the pin 15. The lower end of the pin 15 is located in a short slot 18 in the end of the shorter arm 19 of a horizontal bell crank 20 which is pivoted at its elbow adjacent one side of the slot 17 in the base plate 1, the other arm 21 of the bell crank 20 being substantially paralel to the operating rod 3. The bell crank 20 is held away from the underside of the base plate 1 by means of a sleeve 22 on its pivot mounting and is fitted with a downwardly projecting knuckle 23 at the free end of the longer arm 21.

Rigidly connected onto one end of the mounting 4 and at the end thereof towards which the free arm 22 of the bell crank 20 extends is a downwardly extending arm 24 which passes through a second and suitably shaped hole 25 in the base plate 1. The arm 24 projects through the hole 25 and is bent outwardly parallel to the operating rod 3 or at a suitable angle thereto and then downwardly and is fitted at its lower end with a knuckle 26. These bends are such that the arm 24 does not interfere with the motion of the bell crank 20.

In use the base plate 1 is firstly bolted over a suitable hole 27 cut in the tunnel 28 with the operating rod 3 transverse to the vehicle propeller shaft. The exact location of the base plate 1 on the tunnel 28 will be determined by the driving position. This is also done in such a way that the downwardly extending arm 24 of the gear shift mechanism is on the same side of the propeller shaft as the gear operating lever 29 of the gear box 30.

The gear operating lever 29 on the type of motor car in this example is on the side of the gear box 30 and extends downwardly. This operating lever 29 has three positions namely a rearward position for first, third and reverse gears, a neutral position, and a forward position for second and fourth gears, The gear selector lever 31 is on top of the gear box 30 and has three positions namely a forward position for reverse, an intermediate position for first and second gears and a rear position for third and fourth gears.

To fit the gear shift mechanism in place of steering column change mechanism the existing linkages on the car are disconnected at the gear operating and selecting levers 29 and 31 and secured to the car or removed completely. The knuckle 23 on the bell crank 20 is then connected to the gear selector lever 31 by means of a suitable link 32 and the knuckle 24 on the arm 24 is likewise connected to the gear operating lever 29.

It will be appreciated that the side of the slot 17 in the base plate 1 adjacent which the bell crank 20 is pivoted is critical in order to obtain the correct direction of motion of the free end thereof such that the normal "H" positions of the gear shift lever 10 may be utilised.

The pivot for bell crank 20 in this case is such that the knuckle 23 moves substantially forwards when the gear shift lever 10 is moved to the left of the H.

It will be appreciated then that the normal H-type of gear shift is provided wherein first gear is top left of the H second gear bottom left, third gear is top right, and fourth gear is bottom right. Reverse gear here is extreme left, beyond the limit of the crossbar of the H and then upwards (i.e. away from the driver).

There are pre-specified distances of travel for the gear operating and selector levers 29 and 31 respectively and these may be met by adjusting the length of the arm 24 and the relative lengths of the arms 19 and 21 of the bell crank 30. The mechanism may be made to fit a number of different cars as far as this is concerned merely by drilling holes in the required arms at various precalculated positions along the lengths of such arms or by substitution of differently designed bell cranks and arms from the operating rod 3 and mounting 4.

It will be appreciated that there are many variations which may be made to the above example without departing from the scope of this invention. For example the mechanism could even be made to function with the operating rod parallel to the drive shaft. In the above application then the arm on the mounting could operate a bell crank and the pin on the operating rod could act direct or through a simple lever, whichever is applicable in that case.

It will also be appreciated further that although the gear shift mechanism of this invention has only been described for converting purposes, it could equally well be fitted to new cars as a standard fitting either alone or in conjunction with a column gear shift.

FIG. 6 shows a modification which is necessary where the gear selector lever 31 and operating lever 29 are not inherently biased to a neutral position.

In this case compression springs 33 of equal strength are mounted to centralise the operating rod 3 in the mounting 4. The springs 33 act between the outer ends of the journals 2 and plates 34 held in position by suitable retaining members 35 screwed into the ends of the operating rod 3.

The FIGS. 7 and 8 of the drawings illustrate modifications which may be incorporated in the gear shift mechanism to enable it to be used with motor vehicle gear boxes which have no selector lever but only a series of say three operating levers which must be moved to engage any desired gear.

With this arrangement an arm 36 is mounted for selective and independent rotational movement with the operating rod 3, there being one arm 36 for each gear operating lever on the gear box.

The arms 36 are mounted on the rod 3 which carries a key 37 which later on, by axial movement of the rod 3 through the gear shift lever 10, be made to engage in a keyway 38 in the arms 36. The arms 36 project from the mounting 4 and through suitable slots 39 in the base plate 1.

To move any particular arm 36 in a forward or rearward position a further holding pin 40 is carried by the rod 3 and is engaged in an appropriately formed recess 41 in mounting 4 so that the mounting and rod 3 may be rotated in unison.

A mechanism (not illustrated) is provided to hold the gear shift lever 10 in a position in which the pin 37 remains in engagement in the desired keyway 38. This mechanism is preferably one by means of which three snap-action stops are provided, one stop for each desired position of the rod 3. This preferred mechanism may therefore comprise a spring loaded pin bearing on the rod 3 and shaped to engage in one of three spaced notches in the rod at any one time. An alternative preferred form of the mechanism may comprise a spring steel strip having three concavities therein for holding the lower end of the gear shift lever 10 itself in one of the three desired positions.

It will be appreciated that the operating of the gear shift lever 10 is the same as in the previously described embodiments of this invention.

It will therefore be seen that the present invention provides a very useful, easy to fit and cheap to manufacture, gear shift mechanism.

It may be found under particularly severe conditions that relative motion of the gear box to the tunnel causes faulty gear change or causes the gears to slip out of mesh. This could easily be rectified by inserting some resilient means in the gear linkages to absorb such movement. The gear shift mechanism could also for the above reason or any other reason, be mounted on brackets supported by the gear box, or in fact may be mounted on any suitable supporting member.

What I claim as new and desire to secure by Letters Patent is:

1. A motor vehicle floor operable gear shift mechanism comprising: a base plate supporting co-axial journals thereon, an axially slidable operating rod in said journals, a rotatable mounting on the operating rod, levers operatively connected to said rod and mounting adapted to be linked to the control lever projections from a motor vehicle gear box.

2. A gear shift mechanism as claimed in claim 1 wherein the operating rod is spring loaded to a predetermined position relative to the mounting.

3. A gear shift mechanism as claimed in claim 1 wherein a gear shift lever is pivotally connected with the mounting and slide.

4. A gear shift mechanism as claimed in claim 3 in which the gear shift lever is pivotally supported in the mounting with one end pivotally attached to the operating rod.

5. A motor vehicle floor operable gear shift mechanism comprising: a base plate supporting co-axial journals thereon, an axially slidable operating rod in the journals a rotatable mounting on the operating rod, arms carried on the operating rod, each of the arms adapted to be connected to a different gear box operating lever, and means for selectively connecting an arm to rotate in unison with the operating rod and mounting.

6. A motor vehicle floor operable gear shift mechanism as claimed in claim 3 in which one of the levers is formed as an arm rigidly connected to the mounting and extending away from the gear shift lever and the operating rod carries a pin thereon extending away from the axis of the rod and oppositely to the gear shift lever.

References Cited

UNITED STATES PATENTS

| | | | |
|---|---|---|---|
| 1,123,391 | 1/1915 | Schlatter. | |
| 3,008,342 | 11/1961 | Brunot | 74—473 |
| 3,312,119 | 4/1967 | Heald | 74—473 |

MILTON KAUFMAN, Primary Examiner